Patented Sept. 29, 1942

2,297,520

UNITED STATES PATENT OFFICE 2,297,520

PROCESS FOR THE PRODUCTION OF ε-CAPROLACTAM

Georg Wiest and Heinrich Hopff, Ludwigshafen-on-the-Rhine, Germany; vested in the Alien Property Custodian No Drawing. Application April 6, 1940, Serial No. 328,388. In Germany April 6, 1939

5 Claims. (Cl. 260—239)

The present invention relates to a process for the production of ε-caprolactam.

In the Beckmann rearrangement of cyclohexanoneoxime into ε-caprolactam the oxime was hitherto dissolved in an excess of concentrated sulphuric acid and the solution heated.

We have now found that the reaction may be carried out with very good yields by using about one half to one molecular proportion of sulphuric acid of 60 to 90 per cent strength per each molecular proportion of the oxime. The removal of the reaction heat, which is largely absorbed already by the water present during the reaction, may be assisted by the addition of suitable solvents, as for example glacial acetic acid.

The reaction solution may be heated in a thin layer in order to provide for a large evaporation surface. An advantageous manner of carrying out the invention consists in heating the oxime alone to the reaction temperature and, if desired, heating the sulphuric acid, too, and then mixing the two materials intensely in such a manner that at any time only small amounts of the oxime and the sulphuric acid come for the first time into contact with one another. The mixing may be effected by means of spraying nozzles by which the substances are sprayed or atomized and simultaneously mixed. Suitable working temperatures are between 90° and 250° C., especially between 120° and 180°. It may be advantageous to cool the reaction space in order to remove part of the reaction heat.

In order to complete the conversion it is often suitable to subject the reacted mixture to an after-heating.

The following examples serve to illustrate how the present invention may be carried out in practice, but the invention is not restricted to these examples. The parts are by weight.

Example 1

113 parts of cyclohexanoneoxime are dissolved in 110 parts of 75 per cent. sulphuric acid at room temperature. The solution is allowed to trickle down as a thin layer over a surface of ceramic material or enamel heated to 150° C. During this treatment the rearrangement takes place. The solution then flows into a mixer in which it is neutralized with caustic soda solution. The aqueous, weakly alkaline solution is exhaustively extracted by means of an organic solvent, for example chloroform or carbon tetrachloride. After evaporating the solvent and distilling the residue, the ε-caprolactam is obtained in a yield of 91 per cent. of the theory.

Example 2

113 parts of cyclohexanoneoxime and 140 parts of 60 per cent. sulphuric acid are separately heated to 140° C., mixed in a nozzle under pressure and atomized. The reaction mixture is neutralized by means of milk of lime, the calcium sulphate formed is filtered off by suction and the filtrate is evaporated in a vaporizer. By distillation of the evaporation residue, the ε-caprolactam is obtained in a very good yield.

What we claim is:

1. The process of producing ε-caprolactam by treating cyclohexanoneoxime with sulphuric acid which comprises heating the cyclohexanoneoxime to the reaction temperature and mixing each molecular proportion thereof with from about ½ to 1 molecular proportion of from 60 to 90 per cent of sulphuric acid intensely in such a manner that at any time only small amounts of the oxime and the sulphuric acid come for the first time into contact with one another.

2. The process of producing ε-caprolactam by treating cyclohexanoneoxime with sulphuric acid which comprises heating the cyclohexanoneoxime to the reaction temperature, heating separately sulphuric acid of from 60 to 90 per cent strength and mixing each molecular proportion of the oxime with from about ½ to about 1 molecular proportion of the said sulphuric acid intensely in such a manner that at any time only small amounts of the oxime and the sulphuric acid come for the first time into contact with one another.

3. A continuous process for the conversion of cyclohexanoneoxime to ε-caprolactam which comprises creating a mixture of cyclohexanoneoxime and sulfuric acid diluted with a volatile liquid, said mixture having from about 1 to about 2 molecular proportions of oxime to one molecular proportion of acid and said sulfuric acid being of a concentration of from 60 to 90% in said volatile liquid; carrying out the rearrangement reaction by bringing said components in admixture under temperature conditions within the range of about 90° to about 250° C., said mixture during the rearranging reaction having a large surface area, and removing the heat of reaction by evaporating the volatile liquid from the rearranging mixture.

4. The process in accordance with claim 3 characterized in that the rearrangement reaction is carried out by passing a mixture of cyclohexanoneoxime and sulfuric acid over a heated surface as a thin film.

5. The process in accordance with claim 3 characterized in that the mixture is created by atomizing the cyclohexanoneoxime and sulfuric acid into admixture with each other, said cyclohexanoneoxime and sulfuric acid having been heated separately to a temperature within the range of 90° to 250° C. prior to creating said atomized mixture.

GEORG WIEST.
HEINRICH HOPFF.